UNITED STATES PATENT OFFICE.

OTTO NICHOLAS WITT, OF WESTEND-CHARLOTTENBURG, PRUSSIA, ASSIGNOR TO THE BADISCHE ANILIN AND SODA FABRIK, OF MANNHEIM, GERMANY.

BLUE DYE.

SPECIFICATION forming part of Letters Patent No. 420,372, dated January 28, 1890.

Application filed August 3, 1889. Serial No. 319,678. (Specimens.) Patented in France April 11, 1889, No. 197,396.

*To all whom it may concern:*

Be it known that I, OTTO NICHOLAS WITT, a citizen of Switzerland, residing at Westend-Charlottenburg, near Berlin, in the Kingdom of Prussia and Empire of Germany, have invented new and useful Improvements in Dye-Stuffs or Coloring-Matters, (for which I have obtained a patent in France, No. 197,396, bearing date April 11, 1889,) of which the following is a specification.

This invention relates to the manufacture of new azo colors, which are principally distinguished from the azo colors hitherto known by their property of producing colored lakes or compounds with metallic mordants in a similar manner to alizarine and allied coloring-matters.

My new azo colors are all produced either from the known beta-naphthohydroquinone or from the beta-naphthohydroquinone beta-sulphonic acid (a substance forming the subject-matter of a separate application for Letters Patent bearing even date with this) by allowing one molecule of either of the said substances to combine with one molecule of an aromatic diazo compound.

I shall now describe the production of a coloring-matter resulting from the combination of one molecule of beta-naphthohydroquinone with one molecule of the so-called "Broenner's" beta-naphthylamine beta-sulphonic acid.

In carrying out my invention I dissolve about twenty-four and a half (24.5) parts, by weight, of the sodium salt of the above-named Broenner's beta-naphthylamine beta-sulphonic acid in about seven hundred and fifty (750) parts, by weight, of water. I then add about seventy (70) parts, by weight, of hydrochloric acid of about 1.12 specific gravity, and gradually add an aqueous solution of about seven and two-tenths (7.2) parts, by weight, of sodium nitrite, (in about twenty-five parts, by weight, of water.) The difficultly-soluble diazo compound thus formed is mechanically separated from its mother-liquor, and then in small portions at a time and under constant agitation added to a solution of about sixteen (16) parts, by weight, of beta-naphthohydroquinone in about sixteen hundred (1,600) parts, by weight, of water, in which about twenty (20) parts, by weight, of crystallized sodium acetate are previously dissolved. By operating in this manner a dark-red solution will be obtained, from which, after a short time, a portion of my coloring-matter will gradually separate out. In order to complete the separation of the coloring-matter I add sodium chloride in sufficient quantity, and I then collect the precipitate thus formed upon a filter.

My new coloring-matter, prepared as above described, presents the following characteristic properties: In its dry state it has the appearance of a dark-brown powder possessing a dim metallic green luster. Its composition corresponds to the formula

$$C_{10}H_6(SO_3Na) - N = N - C_{10}H_5(OH)_2.$$

It is easily soluble in cold water, and the solution possesses a bluish-red color. Upon the addition of hydrochloric acid to this aqueous solution a dark-colored precipitate is produced.

My coloring-matter dissolves in concentrated sulphuric acid with a blackish-blue color. If caustic-soda liquor be added to a moderately-concentrated aqueous solution of the coloring-matter, the above-described bluish-red color of the same turns, first, into a bright and intense blue, which then quickly becomes destroyed upon the access of air or upon the addition of water. This change having taken place, the coloring-matter itself has undergone decomposition. Carbonated alkalies cause a similar destruction.

My coloring-matter produces a dark-blue color in dyeing upon wool with the aid of a chrome mordant, while alumina mordants may be used for the production of bluish-purple shades. It is soluble in alcohol with a reddish-brown color, but insoluble in benzine.

What I claim as new, and desire to secure by Letters Patent, is—

As a new product, the coloring-matter or dye-stuff hereinbefore described, resulting from the combination of one molecule of the (so-called "Broenner's") beta-naphthylamine beta-sulphonic acid with one molecule of beta-naphthohydroquinone, and having the following characteristics: In its dry state it appears under the form of a dark-brown powder, the composition of which corresponds to the formula $$C_{10}H_6(SO_3Na)-N=N-C_{10}H_5(OH)_2,$$

and which is easily soluble in cold water, the aqueous solution becoming precipitated by the addition of hydrochloric acid, while the addition of caustic alkalies causes the bluish-red color of the solution to turn into a bright and intense blue which rapidly fades, (a destruction of the coloring-matter thus taking place,) the coloring-matter dissolves in concentrated sulphuric acid with a blackish-blue color, and produces, in dyeing with the aid of chrome mordants, dark-blue shades, and with the aid of alumina mordants bluish-purple shades.

In testimony whereof I have hereunto set my hand in the presence of two subscribing witnesses.

OTTO NICHOLAS WITT.

Witnesses:
RUDOLF ZAERTLING,
GEO. H. MURPHY.